W. H. LAUBACH.
TRACTION-WHEEL.
No. 178,859.  Patented June 20, 1876.
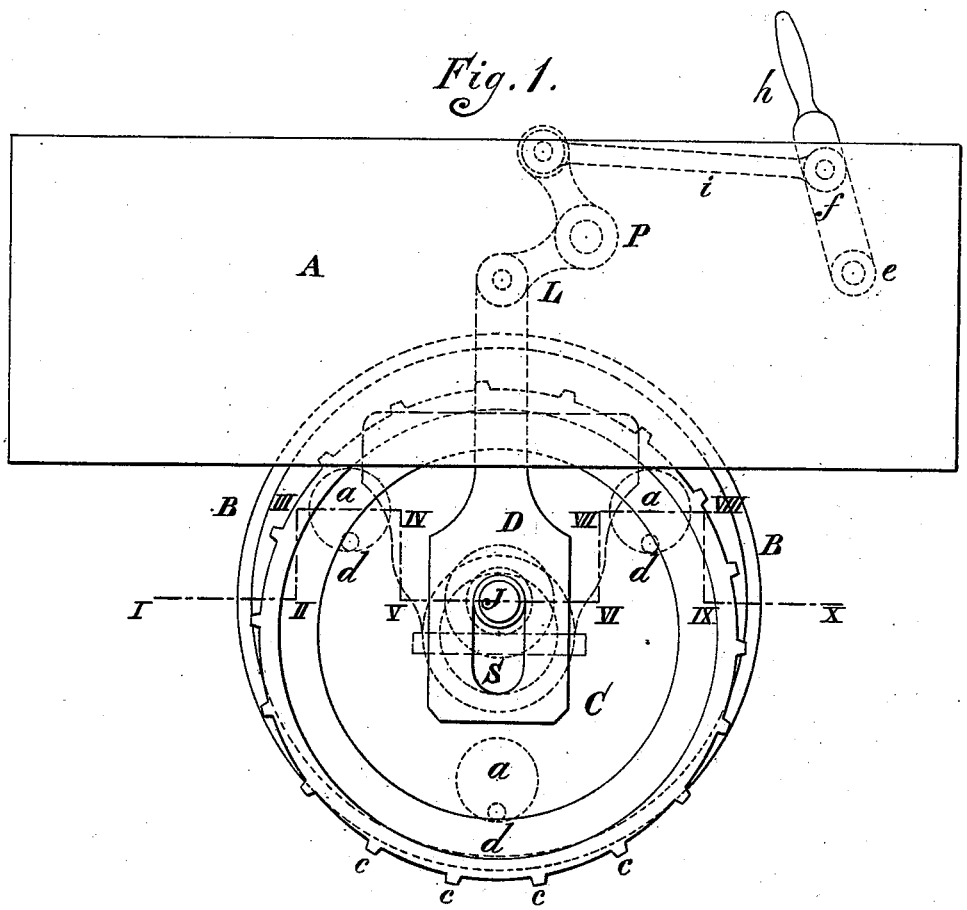
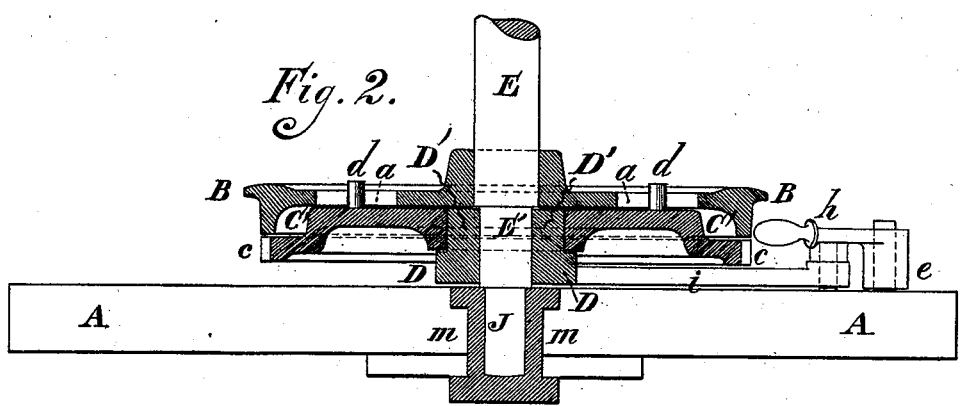
Witnesses  Inventor

UNITED STATES PATENT OFFICE.

WILLIAM H. LAUBACH, OF PHILADELPHIA, PENNSYLVANIA.

IMPROVEMENT IN TRACTION-WHEELS.

Specification forming part of Letters Patent No. 178,859, dated June 20, 1876; application filed November 16, 1875.

*To all whom it may concern:*

Be it known that I, WILLIAM H. LAUBACH, of Philadelphia, county of Philadelphia and State of Pennsylvania, have invented certain Improvements in Street-Railroad Cars, of which the following is a specification:

My invention relates, generally, to the improvement of such street-cars as may be propelled by steam or any other motor than animal-power. The chief difficulty of running such cars by such motors seems to have been that, when the up-grade of the road was heavy, or the rails were covered with ice or snow, the traction of the ordinary car-wheels upon them would not be sufficient to draw the car, and they would merely revolve and slip on them.

Now, the object of this my invention is to surmount that difficulty; and my improvement consists in combining an outside adjustable wheel with each ordinary car-wheel in such a manner that, when the common wheels, from any of the causes before mentioned, have not sufficient traction upon the rails to draw the car, the adjustable wheel may be lowered upon the ground or pavement outside of the rails, and draw the car, so far as may be necessary, when it may be raised again out of the way, so that the ordinary wheel may roll upon the rails, as before.

The periphery of the adjustable wheel may be indented, in order that the teeth may pierce the ice or snow, or take hold upon the ground or pavement.

The means of operating the adjustable wheel will be described with reference to the accompanying drawings, in which—

Figure 1 represents an outside elevation of an adjustable wheel, in combination with a common one, the periphery of the former being below that of the latter, the box being omitted, with the exception of a mere outline, in order that more important parts may be delineated, and Fig. 2 is a bottom view of a horizontal section made through both wheels, as indicated by the broken lines I, II, III, IV, V, VI, VII, VIII, IX, and X.

The common wheel B is fastened upon the axle E, and is provided with apertures $a\ a\ a$ through its body, as shown in Fig. 1, and the axle, upon passing through the wheel, is reduced in diameter, as shown at E', and upon passing through D, which is the bearing of the adjustable wheel C, is again reduced to the journal J, which turns in box $m$.

The adjustable wheel C is provided with teeth $c\ c\ c$, and an interior boss, $c'\ c'$, which is provided with perpendicular studs $d\ d\ d$, to extend through apertures $a\ a\ a$ in the other wheel, so that as the two wheels are face to face, when the axle E revolves, it revolves both wheels together. These studs may, if deemed expedient, have flat heads upon their upper ends to cover the apertures $a\ a\ a$, and thus hold the wheels truly together. But, while the two wheels revolve together, B revolves with the axle E, but C revolves upon its journal or boss D' on its vertically-shifting bearings D.

The bearing is provided with a vertical slot, S, through which the axle is inserted, so that the portion of the axle marked E' may revolve in the same without being affected by the vertical movements of the bearing D, which is suspended upon bell-crank lever L, which works upon its bearing P on the frame A of the truck of the car, and is operated by the engineer by means of handle-lever $h$, pivoted at $e$ upon A, and connected with it by the rod $i$.

The boss C' of the wheel C is within the plane of the periphery of the wheel B, and will, of course, limit the adjustable motion of C. These devices will enable the engineer with ease and quickness to lower and raise any or all of the wheels C, as occasion may require.

The apertures $a\ a\ a$ in wheel B may be in any other form than that shown, such as the spaces between the arms or spokes of a wheel, when wheels having such parts are used, instead of solid ones.

What I claim as my invention, and desire to secure by Letters Patent, is—

1. The combination of the wheel B, having the apertures $a\ a\ a$, and the wheel C, having the studs $d\ d\ d$, adapted to revolve together, the one to roll upon the rail and sustain the car, or the other to roll upon the ground or pavement, and sustain the car instead, as occasion may require, substantially as described and set forth.

2. The adjustable bearing D, having the journal or boss D', and slot S, and the wheel C, substantially as and for the purpose described.

3. The combination of the wheel B, axle E, and bearing D, having the boss D', substantially as described, for the purpose set forth.

WILLIAM H. LAUBACH.

Witnesses:
P. O. DONNELL,
F. L. ROEPKE.